United States Patent
Henrion et al.

(10) Patent No.: US 9,916,246 B1
(45) Date of Patent: Mar. 13, 2018

(54) PREDICTIVE MULTISTAGE COMPARISON FOR ASSOCIATIVE MEMORY

(71) Applicant: Advanced Micro Devices, Inc., Sunnyvale, CA (US)

(72) Inventors: Carson Donahue Henrion, Fort Collins, CO (US); Michael K. Ciraula, Fort Collins, CO (US); Gregg Donley, Sunnyvale, CA (US); Alok Garg, Boxborough, MA (US); Eric Busta, Fort Collins, CO (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 23 days.

(21) Appl. No.: 15/238,209

(22) Filed: Aug. 16, 2016

(51) Int. Cl.
| | |
|---|---|
| *G06F 12/00* | (2006.01) |
| *G06F 12/0811* | (2016.01) |
| *G06F 12/0815* | (2016.01) |
| *G06F 12/128* | (2016.01) |

(52) U.S. Cl.
CPC ...... *G06F 12/0811* (2013.01); *G06F 12/0815* (2013.01); *G06F 12/128* (2013.01); *G06F 2212/621* (2013.01); *G06F 2212/69* (2013.01)

(58) Field of Classification Search
CPC ............. G06F 12/0811; G06F 12/0815; G06F 12/128; G06F 2212/621; G06F 12/69
See application file for complete search history.

(56) References Cited

U.S. PATENT DOCUMENTS

| | | | |
|---|---|---|---|
| 2007/0050564 A1* | 3/2007 | Gunna ................ | G06F 12/0831 711/146 |
| 2011/0072212 A1* | 3/2011 | Kojima ............... | G06F 12/0811 711/119 |
| 2014/0289473 A1* | 9/2014 | Hirao .................. | G06F 12/0864 711/128 |

* cited by examiner

*Primary Examiner* — Shawn X Gu

(57) ABSTRACT

A processing system includes a shadow tag memory, which stores a plurality of entries containing coherency information for the cachelines residing at the various levels of private caches. If a cache miss occurs at a private cache, or if coherency information for a cacheline requires updating, a probe is sent to the shadow tag memory maintained at the shared cache to determine whether the requested (or affected) cacheline is stored at another private cache. The probe includes a tag which can be divided into two or more portions. To more efficiently compare the probe tag to the shadow tag entries, the comparison is performed in multiple stages based on the portions of the probe tag.

20 Claims, 4 Drawing Sheets

PREDICTIVE MULTISTAGE COMPARISON FOR ASSOCIATIVE MEMORY

BACKGROUND

Description of the Related Art

Processing systems typically implement one or more compute complexes, each compute complex having multiple processor cores and a cache hierarchy which has two or more levels of caches. In the cache hierarchy, each processor core is associated with one or more levels of caches that are private to a corresponding core (hereinafter, the "private caches"). The processing system further implements a shared cache at another level of the cache hierarchy, wherein the shared cache is shared among the processor cores of the compute complex (hereinafter, the "shared cache"). To ensure memory coherency, the cache hierarchy is typically configured to implement a coherency protocol, wherein the caches of the hierarchy maintain coherency status information for their respective cachelines, and communicate cache probes to other caches of the hierarchy to ensure that the rules of the coherency protocol are followed. However, the communication of the coherency probes between caches can negatively impact the performance and power consumption of the processing system.

BRIEF DESCRIPTION OF THE DRAWINGS

The present disclosure is better understood, and its numerous features and advantages made apparent to those skilled in the art by referencing the accompanying drawings. The use of the same reference symbols in different drawings indicates similar or identical items.

DETAILED DESCRIPTION

Figure 1:
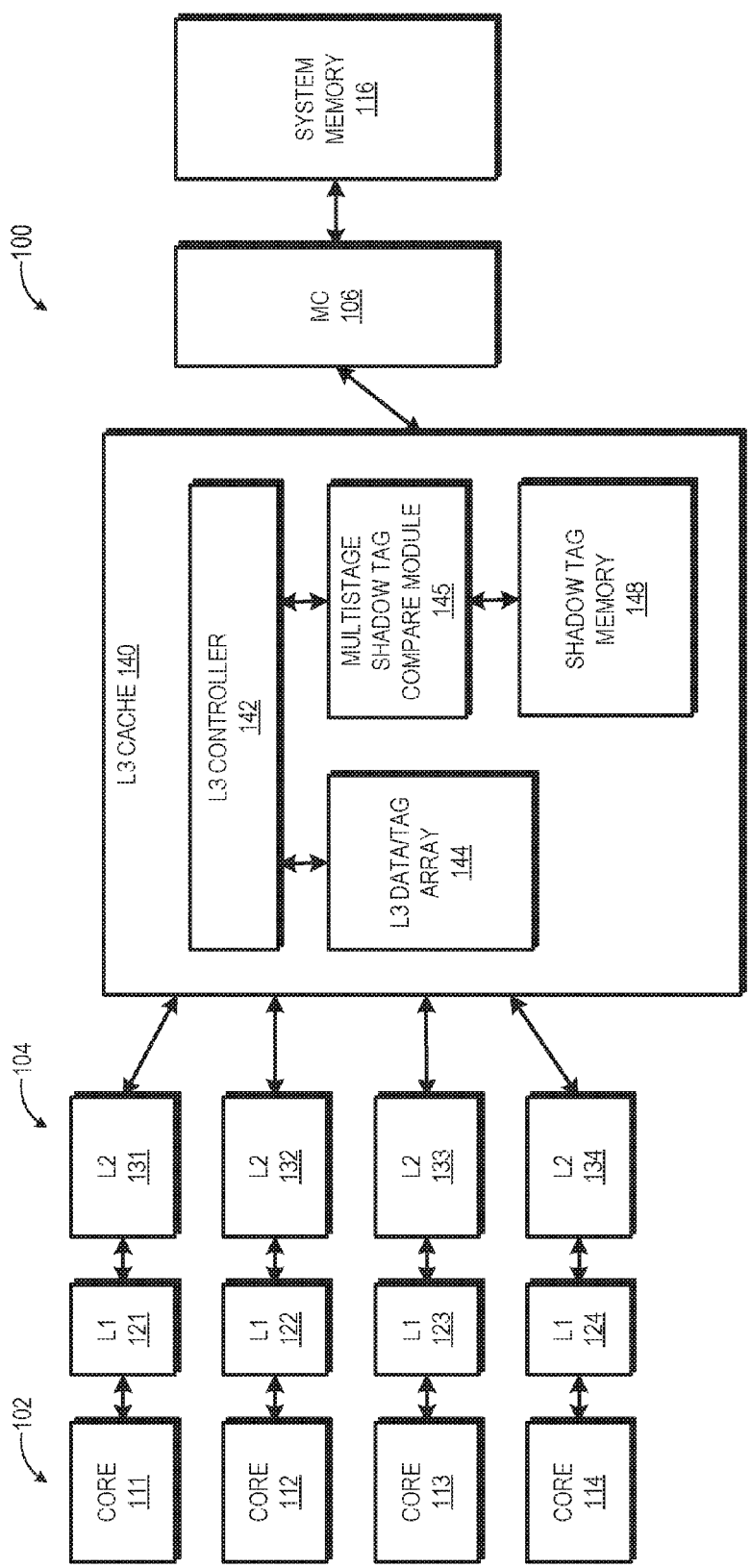
FIG. 1 is a block diagram of a processing system utilizing a multistage shadow tag memory to cache probe comparison in accordance with some embodiments.

FIGS. 1-4 illustrate techniques for utilizing a predictive multistage comparison of associative memory entries for responding to a cache probe, thereby reducing power consumption for cache probe processing. To illustrate, in a multicore processing system in which each core is associated with one or more levels of private caches and the cores share a shared cache at another, non-private, level of the cache hierarchy, the shared cache may maintain a set-associative memory, referred to herein as a shadow tag memory, which stores a plurality of entries containing coherency information for the cachelines residing at the various levels of private caches. If a cache miss occurs at a private cache, or if coherency information for a cacheline requires updating, a probe is sent to the shadow tag memory maintained at the shared cache to determine whether the requested (or affected) cacheline is stored at another private cache. The probe includes a tag which can be divided into two or more portions. To more efficiently compare the probe tag to the shadow tag entries, the comparison is performed in multiple stages based on the portions of the probe tag. In the first stage, a first portion of the probe tag is compared to a first portion of each of the entries in the shadow tag memory. For those entries of the shadow tag memory that match the first portion of the probe tag, a second comparison is performed wherein a second portion of the probe tag is compared to a second portion of the entries. Thus, the first comparison is, in effect, a prediction of which entries of the shadow tag memory are potential matches for the probe tag, and the second comparison identifies the particular entry, of the predicted entries, that matches the probe tag. By performing the shadow tag comparison in multiple stages, the total number of comparisons for each probe tag comparison is reduced, thereby reducing power consumption at the processing system.

To illustrate via an example of at least one aspect of how the techniques disclosed herein can reduce power consumption, in a conventional cache, a cache hit or miss is identified by comparing a probe tag to a set of stored tag values representing the memory addresses of data stored at the cache. To perform the comparison, each bit of the probe tag is compared to a corresponding bit of each tag value in the set of stored tag values. In contrast, using the techniques described herein, a shadow tag memory compares only a subset of the bits (e.g., the ten least significant bits) of a probe tag with corresponding bits of each tag stored in the shadow tag memory. Any matches of the subset of the bits of the probe tag with the corresponding bits of the tags stored in the shadow tag memory can be used to predict which tags in the shadow tag memory will match the received tag value. For each identified match (if any) of the subset of bits, the shadow tag memory compares the remaining bits of the probe tag to the remaining bits for those entries of the shadow tag memory that triggered the match. For those entries that did not trigger a match, no further comparison of bits is performed, and the circuitry for performing such a comparison can be maintained in a low-power or inactive state, thereby conserving power. It will be appreciated that the embodiments described herein are described with respect to a shadow tag memory, but that the techniques described herein can be applied to other set-associative memories.

FIG. 1 illustrates a processing system 100 utilizing a shadow tag memory and a multistage shadow tag compare module in accordance with at least some embodiments. In the depicted example, the processing system 100 includes a compute complex 102, a cache hierarchy 104, a memory controller 106, and a system memory 116. The compute complex 102 includes a plurality of processor cores, such as the four processor cores 111, 112, 113, 114. The processor cores include, for example, central processing unit (CPU) cores, graphics processing unit (GPU) cores, digital signal processor (DSP) cores, or a combination thereof. It will be appreciated that the number of processor cores of the compute complex 102 may be fewer or more than four.

The memory controller 106 operates as the interface between the cache hierarchy 104 and the system memory 116. Thus, data to be cached in the cache hierarchy 104 typically is manipulated as blocks of data referred to as "cachelines", and which are addressed or otherwise located in a memory hierarchy using a physical address of system memory 116. Cachelines are accessed from the system memory 116 by the memory controller 106 in response to memory requests from the cache hierarchy 104. Likewise, when a cacheline containing modified data is evicted from the cache hierarchy 104 and thus needs to be updated in the system memory 116, the memory controller 106 manages this write-back process.

The cache hierarchy 104 includes two or more levels of caches. In the illustrated example, the cache hierarchy 104 includes three cache levels: level 1 (L1), level 2 (L2), and level 3 (L3). For L1, the core complex 102 implements small private caches for each processing core, which are depicted as L1 caches 121, 122, 123, 124, each associated with a corresponding one of processor cores 111, 112, 113, 114.

For L2, the core complex 102 implements larger private caches for each processor core, which are depicted as L2 caches 131, 132, 133, 134 corresponding to processor cores 111, 112, 113, 114, respectively. Each of the L2 caches 131-134 is private to its corresponding processor core, but the cache hierarchy 104 operates to maintain coherency between the L2 caches 131-134. The L2 caches 131-134 can be direct mapped or n-way set associative caches in some embodiments.

For the L3 caching level, the cache hierarchy 104 implements an L3 cache 140 that is shared by the processor cores of the compute complex 102, and thus shared by at least the L2 caches 131-134. The L3 cache 140 implements an L3 controller 142, an L3 data array including a plurality of indexes and a plurality of corresponding ways, each way to store a corresponding cacheline at the corresponding index, and an L3 tag array to store the tag information associated with each index/way. The L3 data array and L3 tag array are collectively illustrated, and referred to herein, as L3 data/tag array 144.

The L3 cache 140 further includes a shadow tag memory 148 to store address and state information for cachelines of the L2 caches 131-134 (that is, to store "shadow tags" representative of the tag information of the L2 caches 131-134). To this end, the shadow tag memory 148 is implemented as a cache, array, table, latches, flops, or other storage configuration so as to include shadow tag entries hierarchically arranged as a plurality of "banks", a plurality of indices, and a plurality of ways. That is, each entry in the shadow tag memory 148 corresponds to a particular bank, index and way combination. Each shadow tag entry in the shadow tag memory 148 tracks information for a corresponding cacheline present in one of the L2 caches 131-134. The information stored at a shadow tag entry for the corresponding cacheline includes, for example, the physical address (or portion thereof) of the cacheline as well as state of the cacheline at the L2 cache. Each bank contains a plurality of indices and ways and represents the shadow tag entries used to track the cachelines present in one of the L2 caches. Thus, for the example of FIG. 1, the shadow tag memory 148 includes four "banks," one for each of the four L2 caches 131-134.

The shadow tag memory 148 is generally employed by the L3 cache 140, as described further herein, to respond to cache probes generated by caches of the cache hierarchy 104. In particular, the L1 caches 121-124 and L2 caches 131-134, together with the L3 cache 140, implement a memory coherency protocol (referred to herein as simply a "coherency protocol"). Each cacheline is associated with corresponding coherency information, as governed by the coherency protocol, to indicate the coherency state of the cacheline, as well as how the cacheline may be handled under the rules of the coherency protocol. For example, the coherency protocol may establish coherency states such as "modified" indicating that the cacheline can be modified at the corresponding cache, "exclusive" indicating that the corresponding cacheline cannot be modified at caches associated with other processor cores, and "shared", indicating that the cacheline is shared by multiple caches of the cache hierarchy 104, and therefore should not be modified. For specified events, as defined by the particular coherency protocol implemented by the processing system, a cache of the cache hierarchy 104 can issue a cache probe to identify the coherency status of a given cacheline at other caches. For example, prior to changing the coherency status of a cacheline from shared to exclusive, a cache can issue a cache probe to identify whether the cacheline is stored at any other cache and, if so, the coherency status of the cacheline at the caches that store the cacheline. Based on responses to the probe, the cache that issued the probe can take appropriate action, as required under the rules of the coherency protocol. For example, if no other caches store the cacheline, the cache can change the state of the cacheline from "shared" to "exclusive."

As indicated above, the shadow tag memory 148 stores shadow tags indicating the cachelines stored at each of the private caches of the cache hierarchy 104. In some embodiments, the shadow tag memory 148 or an associated memory structure can also store the coherency information for the cacheline on behalf of the corresponding cache. In response to a cache probe, the L3 controller 142 accesses the shadow tag memory 148 to determine whether any of the caches of the cache hierarchy 104 stores the cache line and, if so, the corresponding coherency information. Based on the information stored at the shadow tag memory 148, the L3 controller 142 provides a response to the cache probe. Thus, responses to cache probes are satisfied at the L3 cache 140, rather than at each individual cache of the cache hierarchy 104, reducing communication traffic between the caches and conserving system resources and power.

Each cache probe includes a tag value, referred to as a probe tag, indicating the memory address associated with the cache probe. To facilitate more efficient processing of cache probes at the shadow tag memory 148, the L3 cache 140 further includes a multistage shadow tag compare module 145. The multistage shadow tag compare module 145 performs a shadow tag lookup in multiple stages in response to receiving a probe. First, the multistage shadow tag compare module 145 compares a first portion, for example, a number of the least significant bits, of the probe tag to corresponding first portions of the shadow tag entries stored in the shadow tag memory 148. The bits used for the first stage match could be the least significant bits, or any other bits from the tag that increase the odds of matching correctly. For example, including in the first stage match a "valid" bit that indicates the validity of the corresponding tag match can reduce the number of false partial matches under some conditions. In some embodiments, the most effective bits to include in the first stage can be determined by simulations of industry standard benchmarks. This first stage of comparison, in effect, predicts which entries of the shadow tag memory are candidates to match the probe tag. Thus, if none of the first portions of the shadow tag entries match the first portion of the probe tag, the multistage shadow tag compare module 145 sends a signal indicating that a cache miss has occurred.

If at least one of the first portions of the shadow tag entries matches the first portion of the probe tag, the multistage shadow tag compare module 145 compares a second portion, for example, a number of the most significant bits or the remaining bits not included in the first portion, of the probe tag to second portions of the shadow tag entries that matched the first portion of the tag of the received probe. The second stage of comparison confirms which, if any, of the predicted entries from the first stage match the probe tag. If none of the second portions of the shadow tag entries matches the second portion of the probe tag, the multistage shadow tag compare module 145 sends a signal indicating that a cache miss has occurred. However, if there is a match for both the first and second portions of the probe tag, the multistage shadow tag compare module 145 reads the matching entry in the shadow tag memory 148 to identify coherency information for the cacheline associated with the matching shadow tag entry. The L3 controller 142 then generates a probe response based on the identified coherency information according to the cache coherency protocol.

By dividing the shadow tag lookup into multiple operations, the multistage shadow tag compare module 145 can conserve power by reducing the overall number of comparisons for each probe tag. For example, for a processing system with four processing cores and L2 caches having 8-way associativity, a conventional shadow tag lookup requires comparing the 32 bits of the probe tag to the 32 bits of each of the 32 shadow tags. However, in a multistage shadow tag comparison, the first stage of the comparison for such a processing system requires comparing, for example, only the 10 least significant bits of the probe tag to the 10 least significant bits of each of the 32 shadow tags, resulting in significant power savings. The second stage of the lookup requires comparing the second portion of the probe tag to second portions of only those shadow tag entries that matched the first portion of the probe tag, thus greatly reducing the number of comparisons required for the second stage of the lookup. In addition, in some embodiments, the multistage shadow tag comparison module 145 can be configured to exclude from the shadow tag lookup those shadow tag entries associated with cachelines stored in the private cache from which the probe originates. In this way, the power consumed in shadow tag lookups can be further reduced.

Figure 2:
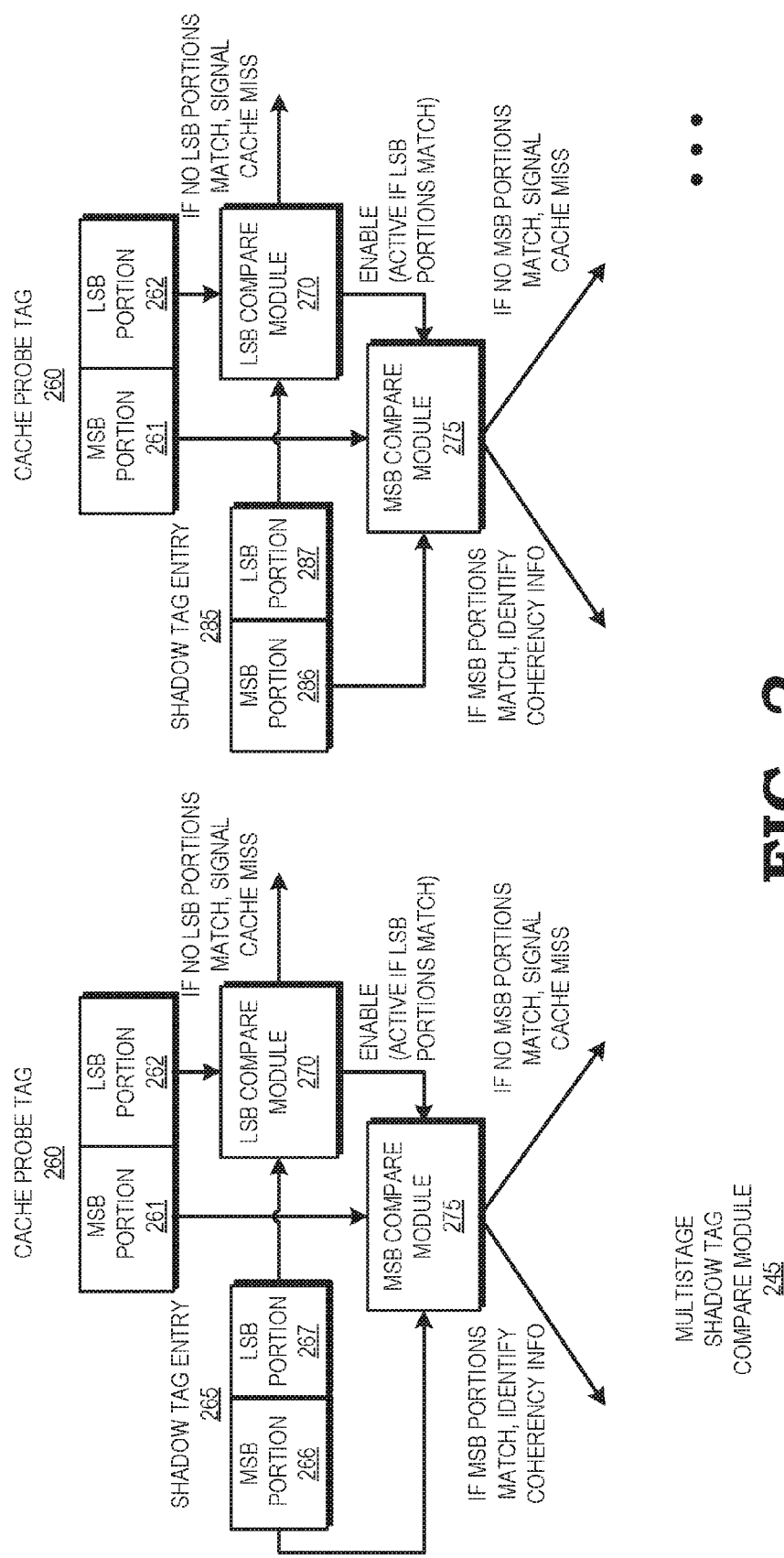
FIG. 2 is a block diagram illustrating an example multistage shadow tag memory to cache probe comparison in accordance with some embodiments.

FIG. 2 illustrates a multistage shadow tag memory probe comparison by the multistage shadow tag compare module 245 in accordance with some embodiments. In the example of FIG. 2, two shadow tag entries 265 and 285 are compared to cache probe tag 260 in a multistage comparison. First, LSB compare module 270 compares least significant bits (LSB) portions 267 and 287 of the shadow tag entries 265 and 285, respectively, to an LSB portion 262 of the cache probe tag 260. If there is a match between one or more of the LSB portions 267 and 287 and the LSB portion 262, the LSB compare module 270 asserts one or more corresponding enable signals to enable a MSB compare module 275, thereby enabling a comparison between most significant bits (MSB) portion 261 of the probe tag 260 and the MSB portions (MSB portions 265 and 285 respectively), that matched the LSB portion 262 of the cache probe tag 260. If there is a match between the MSB portion 266 or 286 and the MSB portion 261, the MSB compare module 275 reads the status, ECC, and valid bits of the matching shadow tag entry to identify coherency information for the cacheline associated with the matching shadow tag entry.

If there is not a match between the LSB portions 267 and 287 and the LSB portion 262 of the cache probe tag 260, the LSB compare module 270 signals a cache miss. Similarly, if there is a match between one or more of the LSB portions 267 and 287 and the LSB portion 262 of the cache probe tag 260, but there is not a match between the MSB portions 266 and 286 and the MSB portion 261 of the cache probe tag 260, the MSB compare module 275 signals a cache miss. Although only two shadow tag entries 265 and 285 are illustrated in the example of FIG. 2, it will be understood that the multistage shadow tag comparison may be performed for any number of shadow tag entries in the shadow tag memory (not shown).

Figure 3:
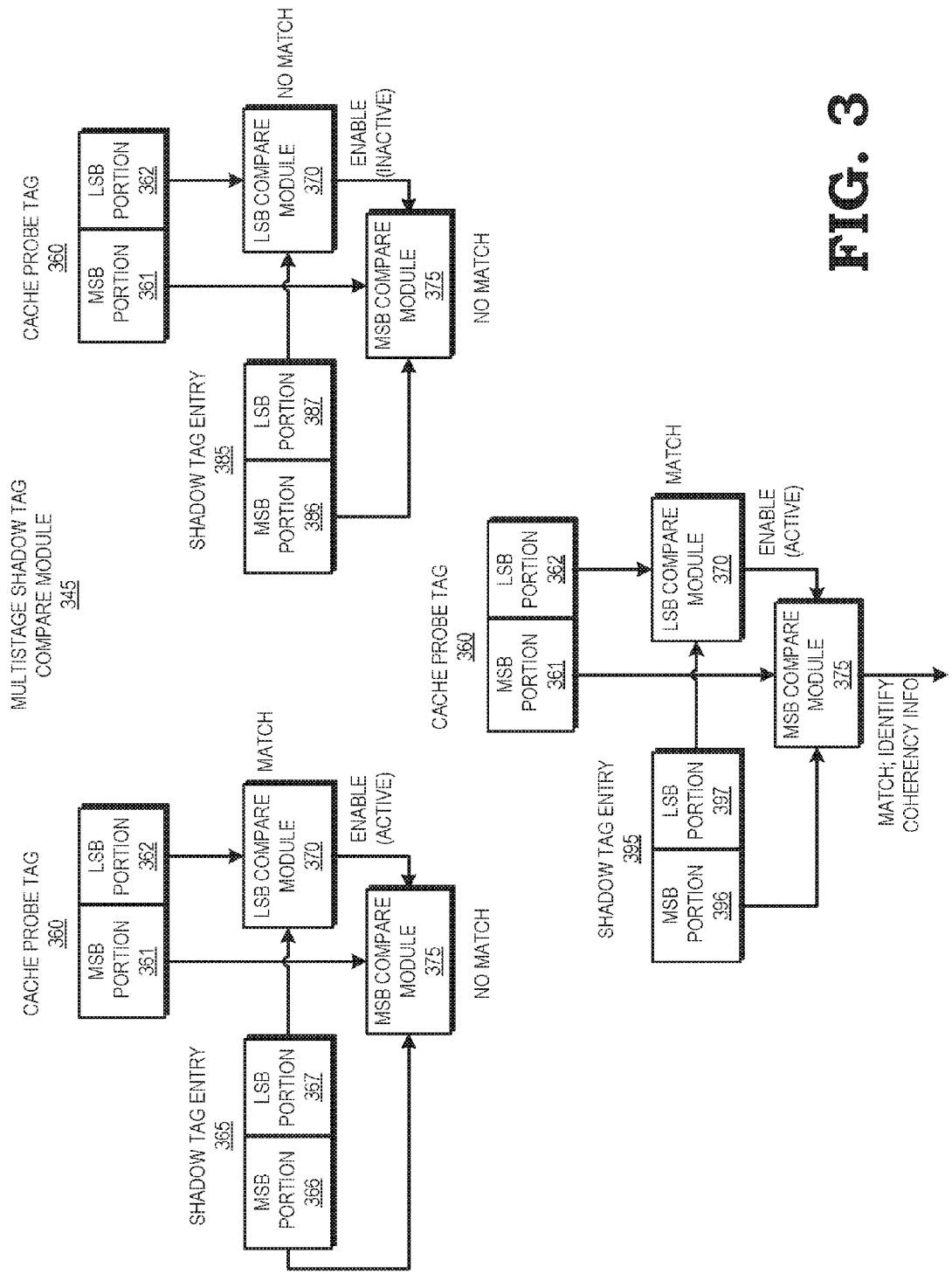
FIG. 3 is block diagram illustrating another example of a multistage shadow tag memory to cache probe comparison in accordance with some embodiments.

FIG. 3 illustrates an example of a multistage comparison of shadow tag entries 365, 385, and 395 to a cache probe tag 360 by the multistage shadow tag compare module 345. First, an LSB compare module 370 compares the LSB portions 367, 387, and 397 of shadow tag entries 365, 385, and 395 to the LSB portion 362 of cache probe tag 360. In the example of FIG. 3, the LSB portions 367 and 397 of shadow tag entries 365 and 395 match the LSB portion 362 of cache probe tag 360, and the LSB portion 387 of shadow tag entry 385 does not match the LSB portion 362 of cache probe tag 360. For the LSB matching shadow tag entries 365 and 395, the LSB compare module 370 asserts an enable signal to enable a second comparison between the MSB portions 366 and 396 of matching shadow tag entries 365 and 395 and the MSB portion 361 of cache probe tag 360. For shadow tag entry 385, the LSB compare module 370 maintains the corresponding enable signal in a negated state, so that no comparison between the MSB portion 386 of shadow tag entry 385 and the MSB portion 361 of the cache probe tag 360 is enabled.

For shadow tag entries 365 and 395, the MSB compare module 375 performs a comparison between the MSB portions 366 and 396 of shadow tag entries 365 and 395 and the MSB portion 361 of the cache probe tag 360. In the example of FIG. 3, the MSB portion 366 of shadow tag entry 365 does not match the MSB portion 361 of the cache probe tag 360. However, the MSB portion 396 of shadow tag entry 395 does match the MSB portion 361 of cache probe tag 360. In response to the match between the MSB portion 396 of shadow tag entry 395 and the MSB portion 361 of the cache probe tag 360, the MSB compare module 375 identifies coherency information for the cacheline associated with the matching shadow tag entry 395. Thus, in the illustrated example of FIG. 3, the MSB portion 361 of the probe tag 360 is only compared to the MSB portion of those shadow tag entries having an LSB portion that matches the LSB portion of the probe tag 360. The overall number of comparisons to identify a matching shadow tag entry is thereby reduced, which in turn reduces power consumption at the processing system.

Figure 4:
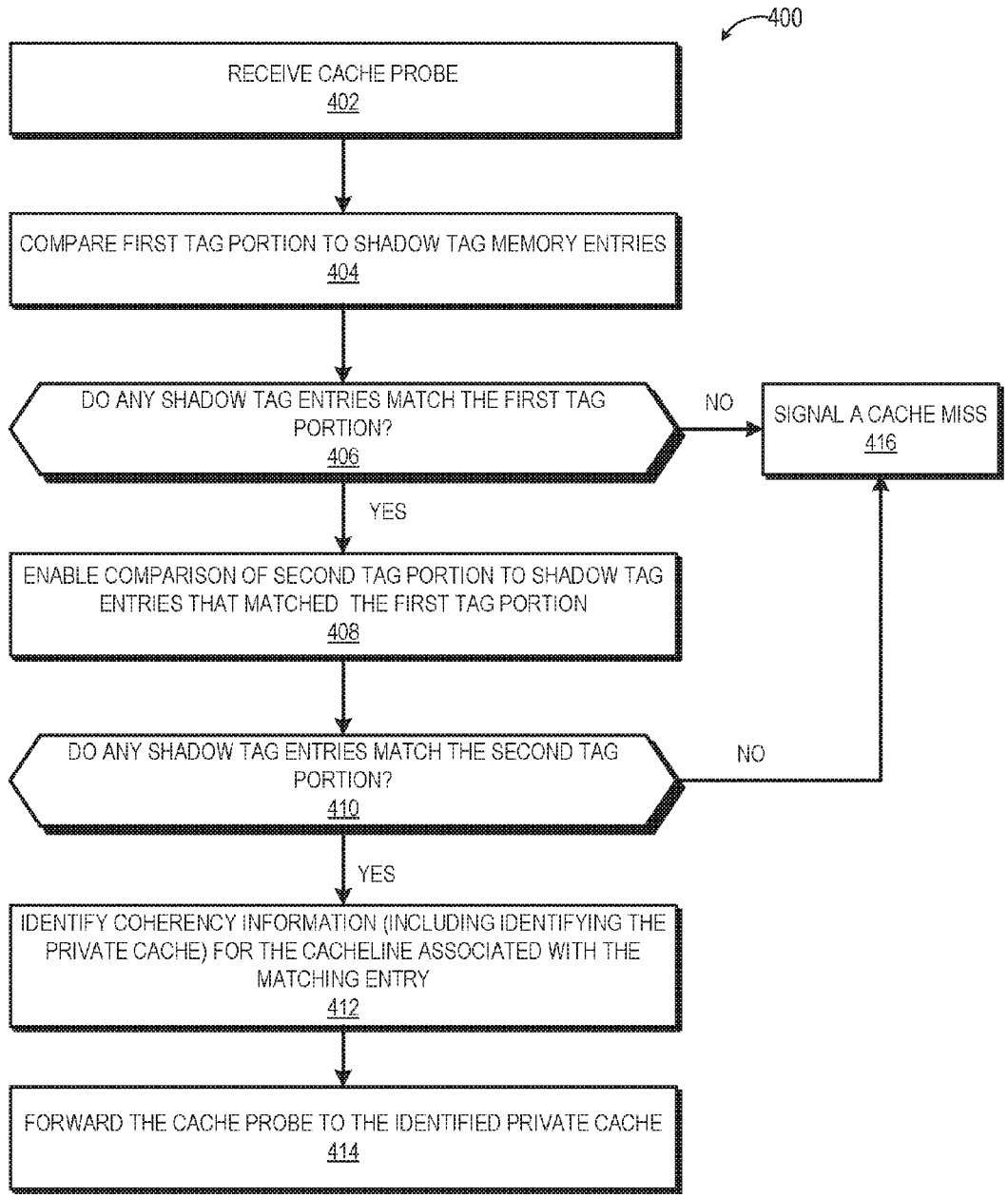
FIG. 4 is a flow diagram illustrating a method of comparing cache probes to a plurality of shadow tag memory entries using a multistage comparison in accordance with some embodiments.

FIG. 4 illustrates a method 400 of comparing shadow tag memory entries to a cache probe tag in multiple stages. At step 402, the multistage shadow tag compare module 145 of FIG. 1 receives a cache probe having a cache probe tag. At step 404, the multistage shadow tag compare module 145 compares a first portion of the cache probe tag to first portions of the entries in the shadow tag memory 148. At step 406, the multistage shadow tag compare module 145 determines whether the first portions of any of the shadow tag memory entries match the first portion of the cache probe tag. If none of the first portions of the shadow tag memory entries matches the first portion of the cache probe tag, at step 416, the multistage shadow tag compare module 145 signals a cache miss. If, at step 406, the multistage shadow tag compare module 145 determines that the first portion of one or more shadow tag entries matches the first portion of the cache probe tag, at step 408, the multistage shadow tag compare module 145 enables a comparison between a second portion of the one or more shadow tag entries that matched the first portion of the cache probe tag and a second portion of the cache probe tag.

At step 410, the multistage shadow tag compare module 145 determines whether any of the second portions of the shadow tag memory entries that matched the first portion of the cache probe tag also match the second portion of the cache probe tag. If none of the second portions of the shadow tag memory entries match the second portion of the cache probe tag, at step 416, the multistage shadow tag compare module 145 signals a cache miss. If, at step 410, the multistage shadow tag compare module 145 determines that the second portion of a shadow tag entry matches the second portion of the cache probe tag, at step 412, the multistage shadow tag compare module 145 identifies coherency information for the cacheline associated with the matching shadow tag entry. In some embodiments, the multistage shadow tag compare module 145 identifies the private cache that stores the cacheline associated with the matching shadow tag entry. In step 414, the multistage shadow tag compare module 145 forwards the cache probe to the identified private cache.

In some embodiments, certain aspects of the techniques described above may be implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method, comprising:
   in response to receiving, at a first cache shared by a plurality of processor cores, a cache probe comprising a first tag associated with a first memory address:
   responsive to a comparison of a first portion of the first tag matching a first portion of at least one entry of a shadow tag memory, comparing a second portion of the first tag to a plurality of second portions of entries of the shadow tag memory to identify coherency information for an entry of a second cache.

2. The method of claim 1, further comprising:
   responsive to the comparison of the first portion of the first tag not matching the first portion of at least one entry of the shadow tag memory, indicating a cache miss at the first cache.

3. The method of claim 2, further comprising:
   in response to the second portion of the first tag not matching a second portion of at least one entry of the shadow tag memory, indicating a cache miss at the first cache.

4. The method of claim 1, further comprising:
   responsive to the first portion of the first tag matching the first portion of at least one entry of the shadow tag memory and the second portion of the first tag matching a second portion of at least one entry of the shadow tag memory, identifying the second cache from a plurality of caches and forwarding the cache probe to the identified second cache.

5. The method of claim 4 wherein the plurality of caches comprises a plurality of private caches, each of the plurality of private caches dedicated to a different one of the plurality of processor cores.

6. The method of claim 5, wherein the cache probe originates from one of the plurality of private caches.

7. The method of claim 6, further comprising excluding from comparison to the cache probe a subset of shadow tag memory entries associated with the private cache from which the cache probe originated.

8. The method of claim 1, wherein the first portion of the first tag comprises a number of least significant bits of the first tag.

9. The method of claim 1, wherein the second portion of the first tag comprises tag bits not included in the first portion of the first tag.

10. A method, comprising:
  comparing first portions of entries of a shadow tag memory of a shared cache shared by a plurality of processor cores to a first portion of a tag for a cache probe associated with a cacheline;
  responsive to matching at least one entry of the shadow tag memory to the first portion of the tag, comparing a second portion of the at least one matching entry to a second portion of the tag; and
  responsive to determining the shadow tag memory has an entry matching the first and second portions of the tag for the cacheline, identifying a private cache associated with the matching entry and forwarding the cache probe to the identified private cache.

11. The method of claim 10, further comprising:
  responsive to determining that the shadow tag memory does not have at least one entry matching the first portion of the tag, signaling a cache miss in response to the cache probe.

12. The method of claim 10, further comprising:
  responsive to determining the shadow tag memory does not have a valid entry matching the first and second portions of the tag for the cacheline, signaling a cache miss in response to the cache probe.

13. The method of claim 10, wherein the first portion of the tag comprises a number of least significant bits of the tag.

14. The method of claim 10, wherein the second portion of the tag comprises tag bits not included in the first portion of the tag.

15. A processing system, comprising:
  a plurality of private caches, each private cache associated with a corresponding processor core of a plurality of processor cores and comprising a corresponding set of cachelines;
  a shared cache shared by the plurality of processor cores, the shared cache comprising a shadow tag memory comprising a plurality of entries, each entry storing state and address information for a corresponding cacheline of the set of cachelines of one of the private caches; and
  a multistage compare module comprising:
    a first stage compare module configured to compare first portions of the entries of the shadow tag memory to a first portion of a tag for cache probe associated with a cacheline;
    a second stage compare module configured to compare second portions of entries matching the first portion of the tag to a second portion of a tag; and
    wherein the multistage compare module is configured to identify coherency information for a cacheline associated with an entry of the shadow tag memory matching the first and second portions of the tag for the cacheline.

16. The processing system of claim 15, wherein the multistage compare module is configured to signal a cache miss in response to the cache probe, responsive to determining that the shadow tag memory does not have at least one entry matching the first portion of the tag.

17. The processing system of claim 16, wherein the multistage compare module is configured to signal a cache miss in response to the cache probe, responsive to determining that the shadow tag memory does not have at least one entry matching the second portion of the tag.

18. The processing system of claim 15, wherein the first portion of the tag comprises a number of least significant bits of the tag.

19. The processing system of claim 15, wherein the second portion of the tag comprises tag bits not included in the first portion of the tag.

20. The processing system of claim 15, wherein the cache probe originates from one of the plurality of private caches.

* * * * *